No. 897,700.

H. ASHBAUGH.
INSULATING COUPLING.
APPLICATION FILED MAR. 7. 1908.

PATENTED SEPT. 1, 1908.

Witnesses
Phil E. Barnes
J. J. Sheehy Jr.

Inventor
Homer Ashbaugh
By James Sheehy
Attorney

UNITED STATES PATENT OFFICE.

HOMER ASHBAUGH, OF INDIANAPOLIS, INDIANA.

INSULATING-COUPLING.

No. 897,700.

Specification of Letters Patent.

Patented Sept. 1, 1908.

Application filed March 7, 1908. Serial No. 419,667.

*To all whom it may concern:*

Be it known that I, HOMER ASHBAUGH, a citizen of the United States, residing at Indianapolis, in the county of Marion and State of Indiana, have invented new and useful Improvements in Insulating-Couplings, of which the following is a specification.

My invention pertains to insulating couplings; and it has for its chief object to provide an insulating coupling, having permanently connected members one of which is arranged eccentrically relative to the other,—this being materially advantageous since it affords a means of adjustment calculated to enable a workman to place a plurality of hanging fixtures in a large hall in exact alinement, to properly center a hanging fixture that is slightly off the center of an apartment, and to overcome the difficulty and make a finished job where there are a number of brackets in a room or hall and said brackets are slightly out of horizontal alinement.

Figure 1:
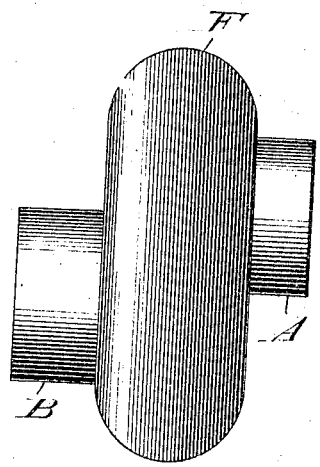
Figure 2:
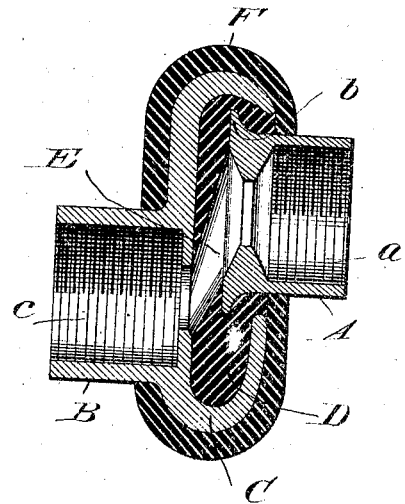

With the foregoing in mind, the invention will be fully understood from the following description and claims when the same are read in connection with the drawings, accompanying and forming part of this specification, in which:

Figure 1 is a side elevation of the coupling constituting the best practical embodiment of my invention of which I am aware; the said coupling being shown in a horizontal position. Fig. 2 is a diametrical section of the coupling.

Similar letters designate corresponding parts in both views of the drawings, referring to which:

A is one of the members of my novel coupling, which is preferably, though not necessarily, made of brass, and is provided with an interior thread *a* and a circumferential end flange *b*, and B is the other coupling member. This latter is preferably made of iron and is provided with an interior thread *c* and also with an eccentric flange C sufficiently large to surround the flanged end *b* of the coupling member A.

The flange C of the coupling member B is of channel form in cross-section, Fig. 2, and hence it is adapted to receive and hold the interior body of insulating material D, which is preferably of mica and has for its office to mechanically connect the two members and at the same time insulate the one from the other. For an open coupling the body of insulating material D is provided with a port or opening E effecting connection between the two members A and B, but for a closed or "blind" coupling the said body of insulating material will of course, be imperforate. This latter feature, however, I have deemed it unnecessary to illustrate.

F is an outer body or jacket of insulating material, preferably micanite. This outer body or jacket F is preferably employed because it covers the joint between the members A and B and assists the inner insulating body D in connecting the same, and also because it effectually prevents the space between the outer sides of the two members A and B becoming electrically bridged.

It will be gathered from the foregoing that in my novel coupling the members are permanently connected together and are electrically isolated from each other, and by virtue of one of the members being arranged eccentrically, relative to the other, one member may be adjusted with respect to the longitudinal center of the other for the purpose of overcoming difficulties in positioning fixtures, and this without disturbing the permanent connection of the members and without affecting the electrical isolation of the same.

As hereinbefore stated the coupling herein shown and described constitutes the best practical embodiment of my invention known to me, but it is obvious that in the future practice of the invention such changes in the form, construction and relative arrangement of parts may be made as fairly fall within the scope of my invention as defined in the claims appended.

Having described my invention, what I claim and desire to secure by Letters-Patent, is:

An insulating coupling comprising members permanently connected together and electrically isolated, one of which is arranged eccentrically relative to the other and is also arranged to be adjusted with respect to the longitudinal center of such other without disturbing the permanent connection of the members or the electrical isolation of the same.

In testimony whereof I have hereunto set my hand in presence of two subscribing witnesses.

HOMER ASHBAUGH.

Witnesses:
JOHN L. DUVALL,
FRANK DRIVER.